United States Patent
Blatter et al.

[15] 3,691,180
[45] Sept. 12, 1972

[54] CYCLOALKANO [C] PYRAZOLES

[72] Inventors: Herbert Morton Blatter, Summit, N.J. 07901; Robert Armistead Lucas, Mendham, N.J. 07945

[73] Assignee: Ciba Corporation, Summit, N.J.

[22] Filed: July 31, 1970

[21] Appl. No.: 60,143

Related U.S. Application Data

[63] Continuation-in-part of Ser. No. 763,410, Sept. 27, 1968.

[52] U.S. Cl.......... 260/295.5 S, 260/141, 260/310 R, 260/311, 260/569, 260/571, 260/574, 260/576, 260/577, 424/273
[51] Int. Cl. ............................................. C07d 49/18
[58] Field of Search ................. 260/310 R, 295.5 S

[56] References Cited

UNITED STATES PATENTS

| | | |
|---|---|---|
| 3,364,227 | 1/1968 | Robinson ............... 260/310 R |
| 3,590,048 | 6/1971 | Swett et al. ............. 260/310 R |

FOREIGN PATENTS OR APPLICATIONS

| | | |
|---|---|---|
| 57,031 | 7/1967 | East Germany ...... 260/310 R |
| 1,145,544 | 3/1969 | Great Britain ......... 260/310 R |
| 126,528 | 6/1928 | Switzerland............ 260/310 R |

OTHER PUBLICATIONS

Auwers et al. Chem. Abst. Vol. 33, Columns 589–590 (1939). QD1.A51
Burnett et al. Chem. Abst. Vol. 53, column 18052 (1959). QD1.A51
Dieckmann Chem. Abst. Vol. 17, pages 724–726 (1923). QD1.A51
Fusco et al. Gazz. Chim. Ital. Vol. 91, pages 1233–1249 (1961). QD1.G28
Huisgen et al. Monatsh. Chemie Vol. 98, pages 1618–1626 (1967). QD1.M73
Strakova et al. Chem. Abst. Vol. 70, No. 77862k (1969). QD1.A51

*Primary Examiner*—Natalie Trousof
*Attorney*—Harry Goldsmith, Joseph G. Kolodny and Mario A. Monaco

[57] ABSTRACT

Cycloalkano[c]pyrazoles, e.g. those of the formula

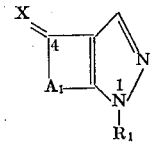

$R_1$ = free or functionally converted hydroxy- or aminophenyl
$A_1$ = alkylene
$X$ = 2H, HOH, or O quaternaries and salts thereof, exhibit antiviral effects and are also valuable intermediates in the preparation of other pharmacologically useful compounds.

4 Claims, No Drawings

CYCLOALKANO [C] PYRAZOLES

CROSS-REFERENCE TO RELATED APPLICATION

This is a continuation-in-part of application Ser. No. 763,410, filed on Sept. 27, 1968.

SUMMARY OF THE INVENTION

The present invention concerns and has for its object the provision of new cycloalkano [c]pyrazoles, more particularly those of the Formula I

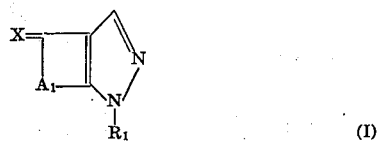

in which $R_1$ is free or functionally converted hydroxy- or amino-phenyl, $A_1$ is lower alkylene separating the adjacent carbon atoms by two to four carbon atoms, and X is 2 hydrogens, hydrogen and hydroxy, or oxo, quaternaries and salts thereof, and methods for the preparation of said compounds; as well as corresponding pharmaceutical compositions, their preparation and use. The compounds of the invention possess antiviral activity and are useful for this purpose.

DESCRIPTION OF THE PREFERRED EMBODIMENTS

In Formula I, the free or functionally converted hydroxyphenyl or aminophenyl radical $R_1$ is preferably a phenyl radical substituted by at least one substituent, selected for example from a free, etherified or esterified hydroxy group, such as lower alkoxy, e.g. methoxy, ethoxy, n- or i-propoxy or -butoxy, halo, e.g. fluoro, chloro or bromo, or primary, secondary or tertiary amino, such as amino, lower alkylamine, e.g. methyl-, ethyl- or propylamino, di-lower alkylamine, e.g. dimethylamino or diethylamino or acylamino, such as lower alkanoylamino, e.g. formylamino, acetylamino or proprionylamino. Preferred substituted phenyl radicals are (hydroxy)-phenyl, (lower alkoxy)-phenyl, (halo)-phenyl, (amino)- phenyl, (lower alkylamino)-phenyl, (di-lower alkylamino)-phenyl or (lower alkanoylamino)-phenyl. The term "lower" referred to above and hereinafter in connection with organic radicals or compounds respectively, defines such with up to seven, preferably up to four carbon atoms.

The lower alkylene radical $A_1$ preferably is 1,2-ethylene, 1,2- or 1,3-propylene or 2-methyl-1,2-propylene, but also, for example, 1,2-, 1,3- or 1,4-butylene, -pentylene, -hexylene or -heptylene.

Quaternaries are preferably lower alkyl- or phenyl-lower alkylammonium salts, such as halides, sulfates or sulfonates, e.g. methyl-, ethyl- or benzylammonium chlorides, bromides, iodides, methyl- or ethylsulfates, methane, ethane or p-toluene sulfonates.

The compounds of the invention exhibit valuable pharmacological properties. They exhibit primarily antiviral activity, particularly against influenza strains, as can be demonstrated in animal tests, using advantageously mammals, e.g. mice, as test objects. Such tests can be performed, e.g. by administering the compounds of the invention in the form of aqueous solutions or suspensions subcutaneously to mice twice daily for the first three days and singly for the next 10 days in doses between about 100 and 250/mg/kg or preferably at 200 mg/kg, beginning two hours prior to infection with 125 $Id_{50}$ of strain $A_2/JAP_{350}$ or strain $A/PR_8$. Quantitative measurement of virus inhibition can be assessed by an indirect serologic method whereby the geometric mean of the resultant antibody titers of the treated and control animals are determined. In addition to the serologic response assay, virus isolation studies can be completed in which virus titers in the lungs and blood of treated and control animals are compared at various time intervals after infection. Thus, for example, subcutaneous treatment with 1-p-fluorophenyl-4-oxo-6,6-dimethyl-4,5,6,7-tetrahydroindazole, a characteristic compound of the invention, twice daily for the first three days and singly for the next 10 days at doses of 200 mg/kg, of mice infected with influenza virus $A_2/JAP_{305}$ results in a marked reduction of virus content in blood and lungs and, in turn, a decreased production of antiviral antibodies. Accordingly, the compounds of the invention are useful as parenteral antiviral agents. Besides their above-mentioned utility, the compounds of this invention are also useful intermediates in the manufacture of other valuable, e.g. pharmacologically active, products, as described in our copending application, Ser. No. 763,410.

Particularly useful are compounds of Formula I, in which $R_1$ is (hydroxy)-phenyl, (lower alkoxy)-phenyl, (halo)-phenyl, (amino)-phenyl, (lower alkylamino)-phenyl, (di-lower alkylamino)-phenyl or (lower alkanoylamino)-phenyl, $A_1$ is lower alkylene separating the adjacent carbon atoms by two to four carbon atoms, and X is 2 hydrogens, hydrogen and hydroxy, or oxo, quaternaries and acid addition salts thereof.

Preferred are compounds of Formula I, in which $R_1$ is (hydroxy)-phenyl, (lower alkoxy)-phenyl, (halo)-phenyl or (amino)-phenyl, $A_1$ is lower alkylene separating the adjacent carbon atoms by 3 carbon atoms, and X is 2 hydrogens, hydrogen and hydroxy, or oxo, quaternaries and acid addition salts thereof.

More preferred are the compounds of Formula II

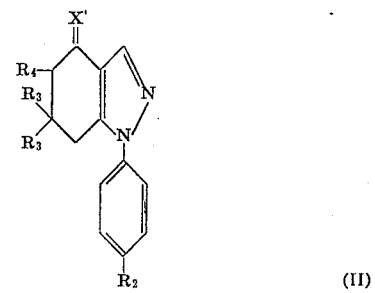

in which $R_2$ is hydroxy, methoxy, fluoro, chloro, bromo or amino, X' is 2 hydrogens, hydrogen and hydroxy, or oxo and each of $R_3$ and $R_4$ is hydrogen or methyl, and therapeutically useful acid addition salts thereof.

Especially valuable are the compounds of Formula II, in which $R_2$ is fluoro or amino, X' is oxo, $R_3$ is methyl and $R_4$ is hydrogen, or in which $R_2$ is fluoro, X' is 2 hydrogens, $R_3$ is methyl and $R_4$ is hydrogen, and therapeutically useful acid addition salts thereof.

The compounds of the invention are prepared according to methods known per se. For example, they are obtained by:

a. ring-closing a compound of the Formula III

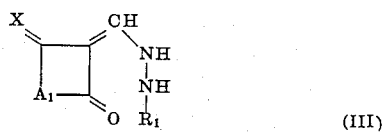

(III)

or, b. converting in a compound of the Formula IV

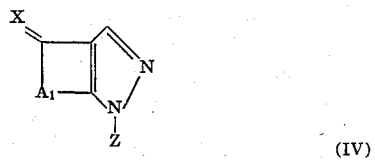

(IV)

wherein Z is a radical convertible into $R_1$, Z into said free or functionally converted hydroxy- or aminophenyl radical and, if desired, converting any resulting compound into another compound of the invention. In the Formulae III and IV, X, $A_1$ and $R_1$ have the meanings given above under Formula I.

According to process (a), the ring closure is preferably carried out in the presence of acids. Such acids are for example, mineral acids, such as sulfuric or phosphoric, Lewis acids, such as aluminum chloride, stannous chloride or polyphosphoric acid, or especially organic sulfonic acids, such as methyl-, ethyl-, p-bromobenzene-, or above all, p-toluenesulfonic acid.

According to process (b), the substituent Z in Formula IV, a radical convertible into $R_1$, is for example a nitrophenyl radical which is reduced, for example, with catalytically activated or, more preferably, nascent hydrogen. Catalysts of preference are for example palladium or platinum. Nascent hydrogen is especially generated from the reaction of a metal, such as a heavy metal, for example, zinc dust in the presence of an alcoholic solvent, such as a lower alkanol, e.g. methanol, ethanol or 2-propanol, and a metallic halide, such as an alkaline earth metal halide, e.g. calcium chloride. The nitro substituent is also replaceable by fluoro, for example, by reacting the nitro compound with an alkali metal fluoride, such as sodium, cesium, rubidium or preferably potassium, in the presence of an aprotic solvent, e.g. dimethyl sulfoxide or dimethyl sulfone at elevated temperatures.

Another substituent Z, especially when X is 2 hydrogens, is, for example, an unsubstituted phenyl radical, which is halogenated, e.g. with the use of halogens, which are advantageously applied in the presence of Lewis acids, e.g. ferric, aluminum, antimony III or tin IV halides, or with the use of halogenation agents, e.g. hydrochloric acid and hydrogen peroxide or sodium chlorate, nitrosyl chloride or bromide, bromosuccin- or phthalimide.

The compounds of the invention so obtained can be converted into each other according to known methods. For example, resulting compounds in which X is oxo can be reduced to compounds in which X is hydrogen and hydroxy according to conventional methods, e.g. with complex light metal hydrides, e.g. sodium borohydride, or can be reduced to compounds in which X is 2 hydrogens, e.g. with simple metal hydrides, e.g. diborane. Resulting compounds, in which X is oxo and containing in α-position at least one hydrogen atom, can be metallized therein, e.g. with the use of alkali metals or their derivatives, such as phenyl lithium, triphenylmethyl-sodium or sodium hydride, amides or alcoholates, and thereupon reacted with reactive esters of lower alkanols. Resulting compounds, in which X is oxo and containing in α-position 2 hydrogen atoms, can be formylated with ethyl formate in the presence of sodium hydride, then the resulting hydroxymethylidene compound esterified with benzoic anhydride and thereupon the ester reductively cleaved to the corresponding methylated compound with catalytically activated hydrogen, using catalysts such as platinum oxide. Thus, for example, 1-p-fluorophenyl-4-oxo-5-methyl-4,5,6,7-tetrahydroindazole is obtained from the corresponding 1-p-fluorophenyl--oxo-4,5,6,7-tetrahydroindazole. Resulting compounds, in which $R_1$ is aminophenyl or lower alkylaminophenyl, can be reacted with a reactive ester of a corresponding alcohol, e.g. a lower alkanol, or can be acylated, for example, with a reactive functional derivative of a corresponding acid, such as a halide or anhydride thereof, or resulting acyl derivatives can be hydrolyzed, for example, with the use of acidic or alkaline hydrolyzing agents. Resulting compounds, in which $R_1$ is tertiary aminophenyl, can be quaternized in the usual manner, for example, with the use of reactive esters of lower alkanols or phenyl-lower alkanols. Resulting compounds, in which $R_1$ is free aminophenyl can be diazotized with sodium nitrite in the presence of a mineral acid, for example, a hydrohalic acid, such as hydrochloric acid, or sulfuric acid. The resulting diazonium salt can be treated with a cuprous halide, e.g. chloride or bromide, according to the Sandmeyer reaction to give the corresponding chloro or bromophenyl compounds. Resulting compounds, in which $R_1$ is lower alkoxyphenyl, can be cleaved to the corresponding free hydroxy-phenyl compounds in the usual manner, for example with the use of Lewis acids, such as aluminum chloride. In turn, resulting free hydroxyphenyl compounds can be alkylated with lower alkyl sulfates, such as dimethyl sulfate, under basic conditions.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halobenzenesulfonic, toluenesulfonic, naphthalenesulfonic, sulfanilic or cyclohexyl-sulfamic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate produce obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the process of the invention that lead to the formation of those compounds indicated above as being specially valuable.

The starting materials used are known or, if new, can be prepared according to known methods. For example, in process a) when X is oxo, compounds of the Formula III are obtained by the displacement of the anilino radical of a 1-(2,5(6 or 7) dioxocycloalkylidenemethyl)-aniline with $R_1$-hydrazine, wherein $R_1$ is as defined under Formula I. The 1-(2,5(6 or 7)-dioxocycloalkylidenemethyl)-aniline is prepared by condensation of cycloalkane-1,3-diones with N-phenyl formimidate, which is in turn obtained according to the method described in J. Am. Chem. Soc., 78, 4778 (1956). Compounds of the Formula IV in process (b) are obtained by ring closure according to the method described above in process (a).

The pharmacologically active compounds of the invention are useful in the manufacture of pharmaceutical compositions comprising an effective amount thereof in conjunction or admixture with excipients suitable for parenteral application. Preferred are injectable compositions, for example aqueous isotonic solutions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing methods and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are in parts by weight.

EXAMPLE 1

The solution of 8.3 g 1-(4,4-dimethyl-2,6-dioxocyclohexylidenemethyl)-2-p-fluorophenylhydrazine and 0.176 g p-toluenesulfonic acid in 85 ml toluene is refluxed for 2 ½ hours. Upon cooling, the solution is washed with water, dried over anhydrous magnesium sulfate, filtered and evaporated in vacuo. The residue is recrystallized from methanol to give 1-p-fluorophenyl-4-oxo-6,6-dimethyl-4,5,6,7-tetrahydroindazole of the formula

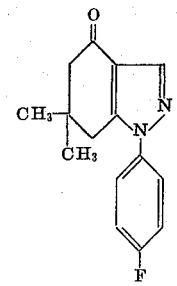

melting at 153°–6°.

In an analogous manner, the a. 1-p-chlorophenyl-4-oxo-6,6-dimethyl-4,5,6,7-tetrahydroindazole, m.p. 150°–151°, and b. the 1-p-bromophenyl-4-oxo-6,6-dimethyl-4,5,6,7-tetrahydroindazole, m.p. 157°–159°, are obtained.

The starting material is prepared as follows:

14.9 g N-phenyl formimidate and 14 g 5,5-dimethyl-1,3-cyclohexandione are stirred at 95° and gradually heated to 140° over a period of 45 minutes, wherein the ethanol formed is removed by distillation. Upon cooling, there is obtained 1-(4,4-dimethyl-2,6-dioxocyclohexylidenemethyl)-aniline, melting at 138°–142°.

To 4.86 g thereof in 48.6 ml anhydrous ethanol with 2.9 ml triethylamine is added 3.24 g p-fluorophenylhydrazine hydrochloride. The mixture is refluxed for 3 ½hours and diluted with 96 ml water. The solids formed are collected on a filter and recrystallized from methanol to give the 1-(4,4-dimethyl-2,6-dioxocyclohexylidenemethyl)-2-p-fluorophenylhydrazine, melting at 204°–205°.

EXAMPLE 2

The solution of 5.0 g 1-p-fluorophenyl-4-oxo-6,6-dimethyl-4,5,6,7-tetrahydroindazole in 67 ml tetrahydrofuran is added slowly with stirring to 58 ml of a 1.0 Molar solution of diborane in tetrahydrofuran in an ice-water bath under nitrogen. The reaction mixture is allowed to come to room temperature and then refluxed for about 17 hours. On cooling, 10 ml 6N hydrochloric acid is added cautiously. The salts formed are filtered off and washed with diethyl ether. The filtrate is evaporated and the residue treated with 33 ml water and 6.7 ml 50 percent aqueous sodium hydroxide. The aqueous solution is extracted with diethyl ether and the extract is passed through a column of activated magnesium silicate and evaporation of the eluate affords the 1-p-fluorophenyl-6,6-dimethyl-4,5,6,7-tetrahydroindazole of the formula

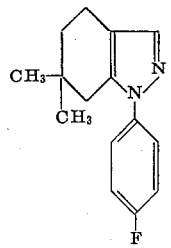

melting at 48°–50°.

EXAMPLE 3

To the solution of 0.64 g 1-p-fluorophenyl-4-oxo-6,6-dimethyl -4,5,6,7-tetrahydroindazole in 12 ml methanol is added 0.64 g sodium borohydride. The mixture is stirred at room temperature for 2 hours and then diluted with 30 ml water. The crystals formed are collected on a filter and washed with water to give the 1-p-fluorophenyl-4-hydroxy-6,6-dimethyl-4,5,6,7-tetrahydroindazole of the formula

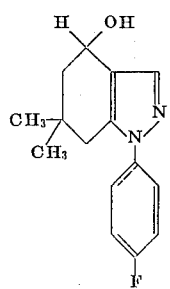

melting at 143°–5°.

EXAMPLE 4

The mixture of 17.4 g 1-(4,4-dimethyl-2,6-dioxocyclohexylidenemethyl)-2-p-methoxyphenylhydrazine (obtained in like manner as above), 0.35 g p-toluenesulfonic acid and 360 ml toluene is refluxed for 2 ½ hours with an attached trap to remove the water formed. On cooling, the toluene solution is washed with water, dried, filtered and evaporated in vacuo. The residue is recrystallized from methanol to give the 1-p-methoxyphenyl-4-oxo-6,6-dimethyl-4,5,6-7-tetrahydroindazole of the formula

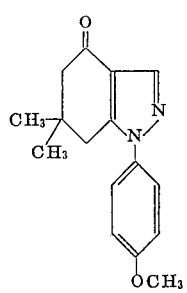

melting at 140°–142°.

EXAMPLE 5

0.6 g 1-p-methoxyphenyl-4-oxo-6,6-dimethyl-4,5,6,7-tetrahydroindazole are added to the slurry of 2.94 g aluminum chloride in 60 ml benzene. The mixture is refluxed for 6 hours and decanted. The solids are washed twice with benzene, dried in vacuo and carefully treated at 5°, with 7.5 ml concentrated hydrochloric acid followed by 7.5 ml water. The resulting solids are collected on a filter, washed with water and recrystallized from acetone to afford the 1-p-hydroxyphenyl-4-oxo-6,6-dimethyl-4,5,6,7-tetrahydroindazole of the formula

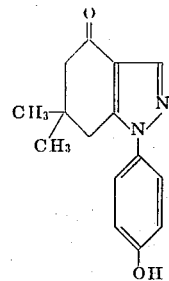

melting point 238°–240°.

EXAMPLE 6

The mixture of 10 g 1-p-nitrophenyl-4-oxo-6,6-dimethyl-4,5,6,7-tetrahydroindazole, 100 g zinc dust, 3.3 g anhydrous calcium chloride, 3.3 ml water and 100 ml 95 percent ethanol is refluxed for one hour. The mixture is filtered hot through filter cellulose, washed with 95 percent aqueous ethanol and the filtrate diluted with 50 ml water and then made basic with ammonium hydroxide. The mixture is extracted three times with methylene chloride and the combined extracts dried, filtered and evaporated. The residual solids are recrystallized from methanol to give the 1-p-aminophenyl-4-oxo-6,6-dimethyl-4,5,6,7-tetrahydroindazole of the formula

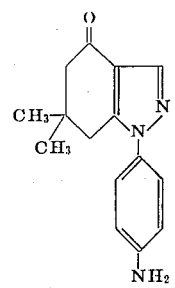

melting at 199°–200°.

EXAMPLE 7

The mixture of 12.4 g 1-(2,6-dioxocyclohexylidenemethyl)-2-p-fluorophenylhydrazine and 0.29 g p-toluenesulfonic acid in 100 ml benzene is refluxed for three hours with a water trap to remove the water formed during the reaction. The mixture is evaporated and dissolved in methylene chloride. The methylene chloride solution is washed with dilute aqueous sodium hydroxide, dried and evaporated. The residue is recrystallized from methylene chloride-hexane to afford the 1-p-fluorophenyl-4-oxo-4,5,6,7-tetrahydroindazole of the formula

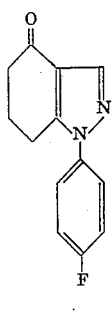

melting at 131°–133°.

Reduction of 4.6 g thereof with diborane in tetrahydrofuran as described in Example 2 affords the 1-p-fluorophenyl-4,5,6,7-tetrahydroindazole, obtained as an oil and showing in its infrared spectrum bands at 2930, 2850, 1505, 1390, 1215 and 830 cm$^{-1}$.

Reduction of 3.45 g thereof with sodium borohydride as described in Example 3 in anhydrous ethanol affords the 1-p-fluoro-phenyl-4-hydroxy-4,5,6,7-tetrahydroindazole, m.p. 111°–112°.

EXAMPLE 8

To the mixture of 6.9 g 1-p-fluorophenyl-4-oxo-4,5,6,7-tetrahydroindazole added to 2.53 g 57 percent sodium hydride dispersed in mineral oil in 75 ml benzene is added 6.66 g ethyl formate in 5 ml benzene and 5 mole percent ethanol over a 20 minute period. The resulting reaction mixture is stirred overnight at room temperature, diluted with water and the benzene layer separated off. The aqueous basic layer is washed with diethyl ether, acidified with hydrochloric acid and extracted with methylene chloride. The extract is dried and evaporated. Recrystallization of the residue with methylene chloride-hexane gives the 1-p-fluorophenyl-4-oxo-5-hydroxymethylidene-4,5,6,7-tetrahydroindazole, m.p. 100°–102°.

To 6.91 g thereof suspended in 10 ml pyridine is added 6.66 g benzoic anhydride in 60 ml diethyl ether. The mixture is refluxed for one half hour then allowed to stir overnight at room temperature. The mixture is evaporated, diluted with water, the solids collected on a filter and dissolved in methylene chloride. The solution is washed with dilute ammonium hydroxide, dried and evaporated. Recrystallization of the residual solids from methylene chloride-diethyl ether gives the 1-p-fluorophenyl-4-oxo-5-hydroxy-methylidene-4,5,6,7-tetrahydroindazole benzoate, m.p. 192°–4°.

8.96 g thereof are hydrogenated in the presence of 1.8 g platinum oxide, 100 ml chloroform and 50 ml ethanol at 1 atmosphere. When 5 percent over the theoretical amount of hydrogen is absorbed, the reaction is stopped and the catalyst filtered off. The filtrate is evaporated and the residue dissolved in methylene chloride. The solution is washed with 5 aqueous sodium carbonate, dried, filtered and evaporated. The residue is redissolved in diethyl ether, filtered through a column of activated magnesium silicate and washed with dilute aqueous hydrochloric acid followed by dilute aqueous sodium hydroxide. The solution is then dried, filtered and evaporated to give the 1-p-fluorophenyl-4-oxo-5-methyl-4,5,6,7-tetrahydroindazole of the formula

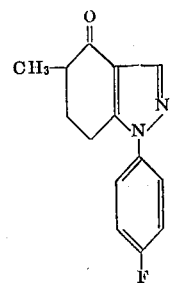

showing in its nuclear magnetic resonance spectrum a doublet at 1.23 ppm.

EXAMPLE 9

Preparation of 3,400 5 ml ampoules each containing 100 mg of the active ingredient.

| Material | Amount | |
|---|---|---|
| 1-p-Fluorophenyl-4-oxo-6,6-dimethyl-4,5,6,7-tetrahydroindazole | 0.340 | kg |
| Chlorobutanol | 0.085 | kg |
| Methylcellulose—100 cps. | 0.1785 | kg |
| Polysorbate 80 | 0.085 | kg |
| Sodium chloride CP | 0.136 | kg |
| Sodium carboxymethylcellulose 70 MW | 0.051 | kg |
| Water for injection, q.s. | 17.000 | lt |

Procedure

The 1-p-fluorophenyl-4-oxo-6,6-dimethyl-4,5,6,7-tetrahydroindazole and chlorobutanol are taken up in 13,000 lt of water for injection at 90°. Sodium carboxymethylcellulose is added and the mixture agitated with a mechanically driven stirring rod. Methyl cellulose is then added and the mixture agitated for 15 minutes to disperse it. It is refrigerated at 10° for 12 hours, mixed well and polysorbate 80 is added. The solution of the sodium chloride in 250 ml water for injection is then added to the above and the mixture diluted to a volume of 17,000 lt with water for injection. The mixture is filtered through a sintered glass filter, coarse porosity, the filtrate placed into 2 lt sterilizer bottles and steam sterilized at 100° for 3 hours and 15 minutes. The sterilized mixture is then filtered into 5 ml sterilized ampoules.

We claim:

1. A cycloalkano [c]pyrazole of the formula

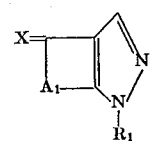

in which R$_1$ is (hydroxy)-phenyl, (lower alkoxy)-phenyl, (halo)-phenyl or (amino)-phenyl, A$_1$ is lower alkylene separating the adjacent carbon atoms by three carbon atoms, and X is 2 hydrogens, hydrogen and hydroxy, or oxo, or therapeutically useful acid addition salts thereof.

2. A compound as claimed in claim 1 and having the formula

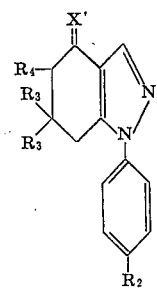

in which $R_2$ is hydroxy, methoxy, fluoro, chloro, bromo or amino, X' is 2 hydrogens, hydrogen and hydroxy, or oxo and each of $R_3$ and $R_4$ is hydrogen or methyl, and therapeutically useful acid addition salts thereof.

3. A compound as claimed in claim 2, in which formula $R_2$ is fluoro or amino, X' is oxo, $R_3$ is methyl and $R_4$ is hydrogen, and therapeutically useful acid addition salts thereof.

4. A compound as claimed in claim 2, in which formula $R_2$ is fluoro, X' is 2 hydrogens, $R_3$ is methyl and $R_4$ is hydrogen, or a therapeutically useful acid addition salt thereof.

* * * * *

PO-1050
(5/69)

UNITED STATES PATENT OFFICE
CASE SU-592/A
CERTIFICATE OF CORRECTION

Patent No. 3,691,180  Dated September 12, 1972

Inventor(s) HERBERT MORTON BLATTER ET AL

It is certified that error appears in the above-identified patent and that said Letters Patent are hereby corrected as shown below:

Cover page, after "[73] Assignee:" delete "Ciba Corporation, Summit, New Jersey" and insert --- CIBA-GEIGY Corporation, Summit, N. J. --- .

Signed and sealed this 19th day of November 1974.

(SEAL)
Attest:

McCOY M. GIBSON JR.
Attesting Officer

C. MARSHALL DANN
Commissioner of Patents